US010550780B2

(12) United States Patent
Fersman et al.

(10) Patent No.: US 10,550,780 B2
(45) Date of Patent: Feb. 4, 2020

(54) POLLUTION HANDLING PROCESS AND SYSTEM FOR VEHICLES

(71) Applicant: Telefonaktiebolaget LM Ericsson (publ), Stockholm (SE)

(72) Inventors: Elena Fersman, Stockholm (SE); Athanasios Karapantelakis, Stockholm (SE); N Hari Kumar, Chennai (IN); Nina Washington, Bromma (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 35 days.

(21) Appl. No.: 15/543,475

(22) PCT Filed: Jan. 21, 2015

(86) PCT No.: PCT/SE2015/050053
§ 371 (c)(1),
(2) Date: Jul. 13, 2017

(87) PCT Pub. No.: WO2016/118055
PCT Pub. Date: Jul. 28, 2016

(65) Prior Publication Data
US 2018/0003116 A1 Jan. 4, 2018

(51) Int. Cl.
*F02D 41/02* (2006.01)
*F01N 13/08* (2010.01)
(Continued)

(52) U.S. Cl.
CPC ........... *F02D 41/029* (2013.01); *F01N 13/08* (2013.01); *F02D 41/2425* (2013.01); *F02D 41/28* (2013.01)

(58) Field of Classification Search
USPC ......... 60/272, 274, 278, 279, 281, 287, 288, 60/292, 324
See application file for complete search history.

(56) References Cited

U.S. PATENT DOCUMENTS 2,116,434 A * 5/1938 Hollister ................ B60K 13/04
180/309
2,166,591 A * 7/1939 Hollister ................ B08B 15/00
137/351
(Continued)

FOREIGN PATENT DOCUMENTS

DE          19948236 A1    4/2001
DE       102012005987 A1    9/2012
(Continued)

OTHER PUBLICATIONS

International Search Report and Written Opinion issued in International Application No. PCT/SE2015/050053, dated Oct. 22, 2015, 11 pages.
(Continued)

*Primary Examiner* — Binh Q Tran
(74) *Attorney, Agent, or Firm* — Rothwell, Figg, Ernst & Manbeck, P.C.

(57) ABSTRACT

The present invention is a method and system for collection of exhaust emissions installed in vehicles and disposal thereof, based on pollution conditions of the surrounding environment, said conditions identified either from sensors installed on the vehicles themselves, or by means of an external service, e.g. the Internet, cloud service, etc.

20 Claims, 5 Drawing Sheets

(51) Int. Cl.
F02D 41/24 (2006.01)
F02D 41/28 (2006.01)

(56) References Cited

U.S. PATENT DOCUMENTS

| | | | | |
|---|---|---|---|---|
| 3,645,098 | A * | 2/1972 | Templin | F01N 3/0814 123/568.11 |
| 6,250,073 | B1 * | 6/2001 | Zimmer | F01N 3/18 180/165 |
| 8,561,389 | B2 * | 10/2013 | Rehling | A62C 3/08 60/281 |
| 8,915,070 | B2 * | 12/2014 | Uhrich | F02D 41/0025 60/274 |
| 9,541,039 | B2 * | 1/2017 | Kolhouse | F02M 26/37 |
| 2003/0233825 | A1 * | 12/2003 | Asanuma | F01N 3/20 60/278 |
| 2009/0171549 | A1 | 7/2009 | Hyde et al. | |
| 2011/0138784 | A1 | 6/2011 | Mafrici et al. | |

FOREIGN PATENT DOCUMENTS

| | | |
|---|---|---|
| EP | 1369558 A2 | 12/2003 |
| JP | 2004270574 A | 9/2004 |

OTHER PUBLICATIONS

European Search Report issued in Application No. 15879130.1 dated Dec. 7, 2017, 8 pages.

* cited by examiner

POLLUTION HANDLING PROCESS AND SYSTEM FOR VEHICLES

CROSS REFERENCE TO RELATED APPLICATION(S)

This application is a 35 U.S.C. § 371 National Stage of International Patent Application No. PCT/SE2015/050053, filed Jan. 21, 2015, designating the United States, the disclosure of which is incorporated by reference.

TECHNICAL FIELD

The present technology relates to processes, systems, computer program and computer program product for enhancing the local environment. More precisely, a pollution handling process, system, computer program and computer program product for vehicles are provided herein.

BACKGROUND

As illustrated in FIG. 1, pollution emissions from a combustion engine 20 of a vehicle 100 raises health concerns especially in densely populated areas. In the current state of art regulations for reducing pollution from vehicle emissions are characterized from spatio-temporal inconsistencies, as they are either being enforced locally, e.g. rerouting traffic from one road to another, thus transferring pollution to another area, and/or have a finite duration.

Additionally, research in particle filters installed in exhaust emission systems of vehicles has resulted in a reduced release of hazardous gases in the atmosphere.

Further, the combustion engines 20 of vehicles 100 are developed to be more fuel-efficient, i.e. consuming less fuel per mile, and to produce less pollution. However, there is a limit of the efficiency of a combustion engine resulting in the emission of a little amount of pollution.

Although the current state of art addresses the problem of pollution from vehicle emissions the fact still remains that pollution from emissions is directly proportional to the number of vehicles in an area. The population density in many big cities is growing. Therefore in densely populated areas, an increasing number of vehicles contribute to a permanently polluted atmosphere even though the vehicles are improved to produce less exhaust fumes and less pollution in the exhaust fumes.

SUMMARY

The object of embodiments of the present invention is to address at least some of the problems outlined above. This object and others are achieved by the process and the system according to the appended independent claims, and by the embodiments according to the dependent claims.

According to one aspect, a pollution handling process and embodiments thereof for a vehicle is provided herein. The vehicle is driven by fuel causing emission of pollutants in the exhaust fumes. The process comprising the steps of collecting the exhaust fumes in a container of the vehicle based on at least one collect decision rule, in order to temporarily store produced exhaust fumes and releasing the collected exhaust fumes from the container based on at least one release decision rule.

According to another aspect, a pollution handling system and embodiments thereof for vehicles is provided herein. The pollution handling system is adapted for a vehicle driven by fuel causing emission of pollutants in the exhaust fumes. The system comprises a controller of the system, a container for collecting exhaust fumes, wherein the container is provided with an inlet unit for receiving the exhaust fumes and an outlet unit for releasing the exhaust fumes, in order to temporarily store produced exhaust fumes. The controller is configured to control the collecting of the exhaust fumes based on at least one collect decision rule, and to control the release of the collected exhaust fumes based on at least one release decision rule.

The process and system provide a number of advantages, e.g.:
Alleviates the problem of vehicle exhaust pollution from heavily congested areas such as cities and highways;
Can be used in conjunction with exhaust collection and disposal facilities to dramatically reduce pollution from exhaust emissions altogether.

BRIEF DESCRIPTION OF THE DRAWINGS

The foregoing, and other, objects, features and advantages of the present invention will be more readily understood upon reading the following detailed description in conjunction with the drawings in which.

DETAILED DESCRIPTION

In the following description, for purposes of explanation and not limitation, specific details are set forth, such as particular circuits, circuit components, techniques, etc. in order to provide a thorough understanding of the present process and system and embodiment thereof. However, it will be apparent to one skilled in the art that the present technique may be practiced in other embodiments that depart from these specific details. In other instances, detailed descriptions of well-known methods, devices, and circuits are omitted so as not to obscure the description of the present technique with unnecessary detail.

In this disclosure, a technique is described for distributing emissions based on contextual factors, e.g. including but not limited to population density, geographical topology—green areas, pollution levels, etc. The technique involves collecting exhaust emissions from vehicles and disposal thereof, based on pollution conditions of the surrounding environment, said conditions identified either from measurement instruments, sensors, etc., installed on the vehicles themselves, or by means of a cloud service, e.g. service provided in the Internet.

As an example, trees are known to store carbon, one of the main emission produced by fossil derived fuels, thus it would be more optimal to distribute emissions in such a way that this is factored in when distributing exhaust emissions, which is not done today.

Figure 1:
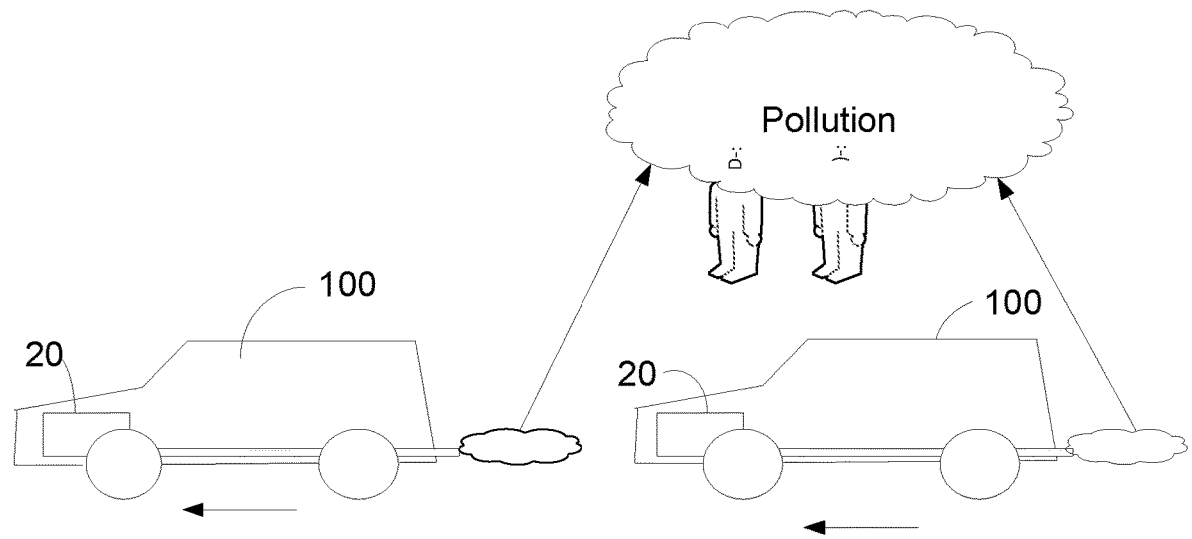
FIG. 1 is a block diagram illustrating the environmental and health problems generated by vehicles with combustion engine.
Figure 2:
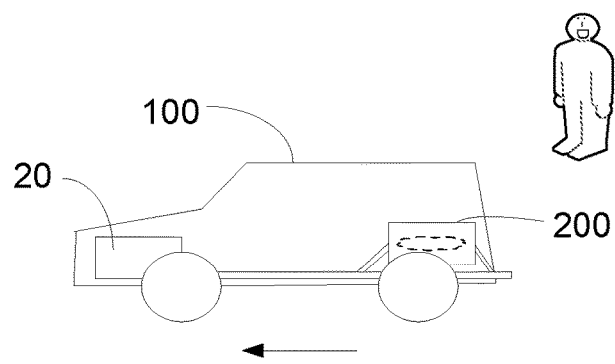
FIG. 2 is a block diagram presenting the solution in general terms.

FIG. 2 is illustrating an example of a pollution handling system for collecting and releasing exhaust emission from a vehicle.

The system 200 is integrated in vehicles 100 and comprises an exhaust fume collector device, tank or container that is able to temporally store the produced exhaust fumes and dissipate the collected exhaust fumes at variable rates.

The exhaust fumes collector is a container built to withstand pressure from emission gases and comprises an ingress valve assembly, where the gases are collected and a pressure relief valve assembly, from where gasses are released. They can be installed in the exhaust emission system of any vehicle and can be used in conjunction with already existing emission particle filters. Optionally, the exhaust fume collectors can have their own exhaust filtration system for further processing of gases prior to release.

Figure 3:
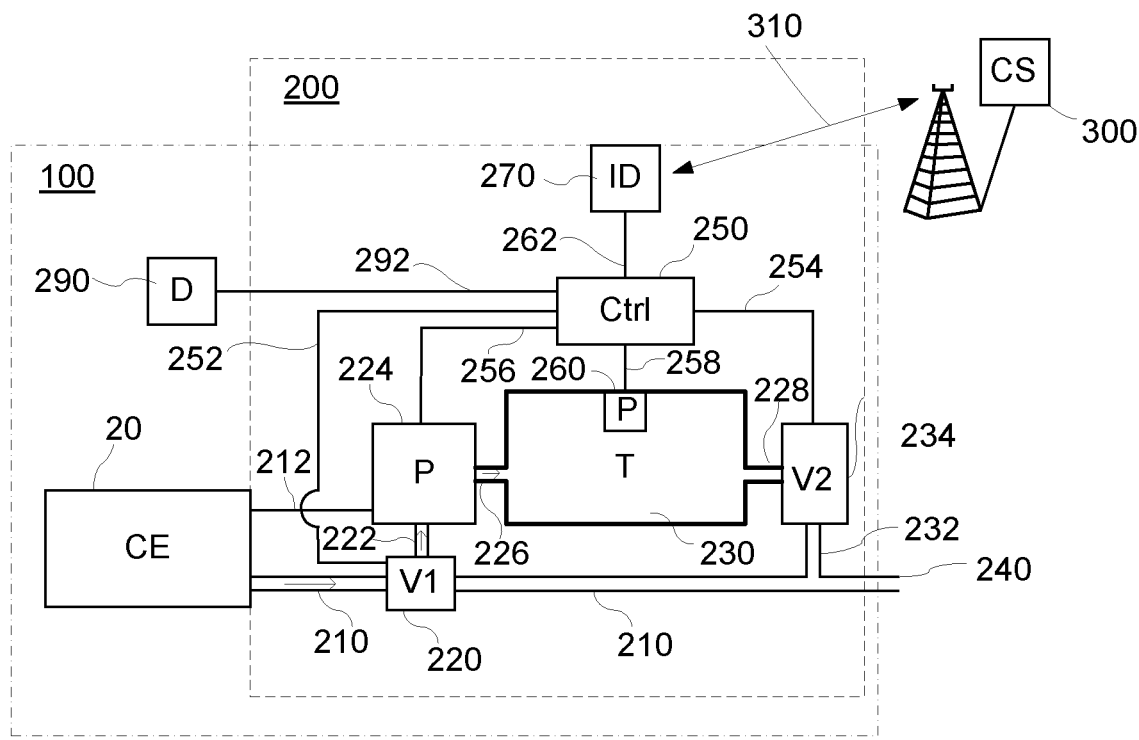
FIG. 3 is a block diagram presenting a system of the solution in more detail.

FIG. 3 is illustrating in more detail an example of a pollution handling system 200 in a vehicle 100. The vehicle 100 comprises a combustion engine 20 driven by a fuel which when fed to the combustion engine generates exhaust fumes comprising pollutants, e.g. sulphur oxides, nitrogen oxides, carbon oxide, etc. Said exhaust fumes are driven by the pressure that the combustion engine 20 generates through the exhaust pipes 210 to open air when the vehicle's pollution handling system 200 is not activated. The pollution handling system comprises a controller, Ctrl, 250 for automatically controlling and activating or deactivating the system 200. The ctrl 250 and system 200 may also be manually activated and deactivated from the vehicle's coupe by the chauffeur of the vehicle.

The pollution handling system 200 further comprises a container, tank, vessel, or equivalent device for storing the exhaust fumes comprising pollutants. The container, T, 230 is designed and adapted to resist very high internal pressure to be able to store a lot of exhaust fumes generated during a normal driving a predetermined distance. The container may also be provided with a cooling system for avoiding the container to be overheated by the high temperature of the fumes leaving the engine and generated of the high pressure in the container. The heat that is conducted away from the container may be used for warming the coupe of the vehicle.

The pollution handling system further comprises an inlet unit for receiving the exhaust fumes. Said inlet unit is an ingress valve assembly comprising a first valve, V1, 220 fixed mounted to the exhaust pipe of the vehicles and a pump, P, 224. The valve V1 220 has a first and second position. In the first position, the valve V1 is open to conduct the exhaust fumes through the exhaust pipes to reach the open air through the pipe 210. In the second position, the valve V1 is closed for stopping the fumes to reach the open air through the pipe 210, but it is open to conduct the exhaust fumes to a pump P 224 of the. The ctrl 250 is adapted to control the positions of the valve V1 and to start and stop the operation of the pump 224.

The ctrl 250 is adapted to control the operation of the pump, e.g. on or off, via a connection 256. The ctrl 250 is connected via a connection 252 to the valve V1 for controlling said first and second positions of the valve V1. The pump is energized and provided by electric power through a conductor 212 from the generator circuits of the vehicle's engine 20.

A vehicle may comprise more than one exhaust pipe, and in that case, of course, each exhaust pipe is equipped with a first valve 220.

The V1 220 is connected via a pipe connection 222 to the pump, P, 224 for filling the container 220 with exhaust fume under pressure. The P 224 is connected to the container via a connection 226. Said connection 226 may be a non-return valve for enabling the system 200 to keep the pressure when the pump is not operating and preventing the exhaust fumes to leak through the pump.

When the pollution handling system is activated for collecting exhaust fumes by the ctrl 250, exhaust fumes are conducted from the exhaust pipe 210 by means of a first valve, V1, 220, and driven under pressure into the container 220 where it is stored until released.

The container T 230 of the pollution connection system further comprises a pressure gauge, P, 260 connected to the ctrl 250 via a connection 258. The pressure gauge 260 may be a transducer for converting pressure into an electric voltage proportional to the pressure. Said voltage is transformed, either by the gauge or an input circuit of the ctrl 250, to a digital signal readable by the ctrl 250. The ctrl 250 is able to check the current pressure in the container 230. The pressure in the container indicates how filled the container is. At a certain pressure $P_F$, the container is filled. The pressure $P_F$ is lower than the pressure $P_{max}$ for which the container is tested and type approved.

The pollution handling system 200 further comprises an outlet unit for releasing the exhaust fumes. Said outlet unit is a pressure relief valve assembly comprising a second valve, V2, 234 connected to the container 230 by means of a pipe connection 228. The outlet unit further comprises an output connection 232, which ends with an output section 240. The valve V2 is further connected to the output connection 232. In one embodiment, said output section may be the output section of the exhaust pipe 210. In another embodiment, the output section of the output connection 232 may be separated from the output section of the exhaust pipes. The valve V2 is controlled by the ctrl 250 via a connection 254. The ctrl 250 is adapted to control the closing or opening of the valve V2. The valve V2 is controlled to be closed during the filling of the container and opened during emptying and releasing of the stored exhaust fumes. By means of the valve V2, the ctrl 250 is able to control the release rate of the collected exhaust fumes at variable rates, and a time length of the release process.

The ctrl 250 may further be provided with information for operating the pollution handling system by means of an information device, ID, 270. The ID 270 is situated in a suitable position in the vehicle 100 and it is connected to the ctrl 250 via a connection 262.

The ctrl 250 may further be connected to a display, D, 290 on an instrument panel of the vehicle 100. The ctrl 250 is adapted to send alarms or requests via a connection 292 to the display D to alert the driver/chauffeur, who may confirm the alarms and/or response to the requests by means of a key, button or touchscreen of the display.

Figure 4:
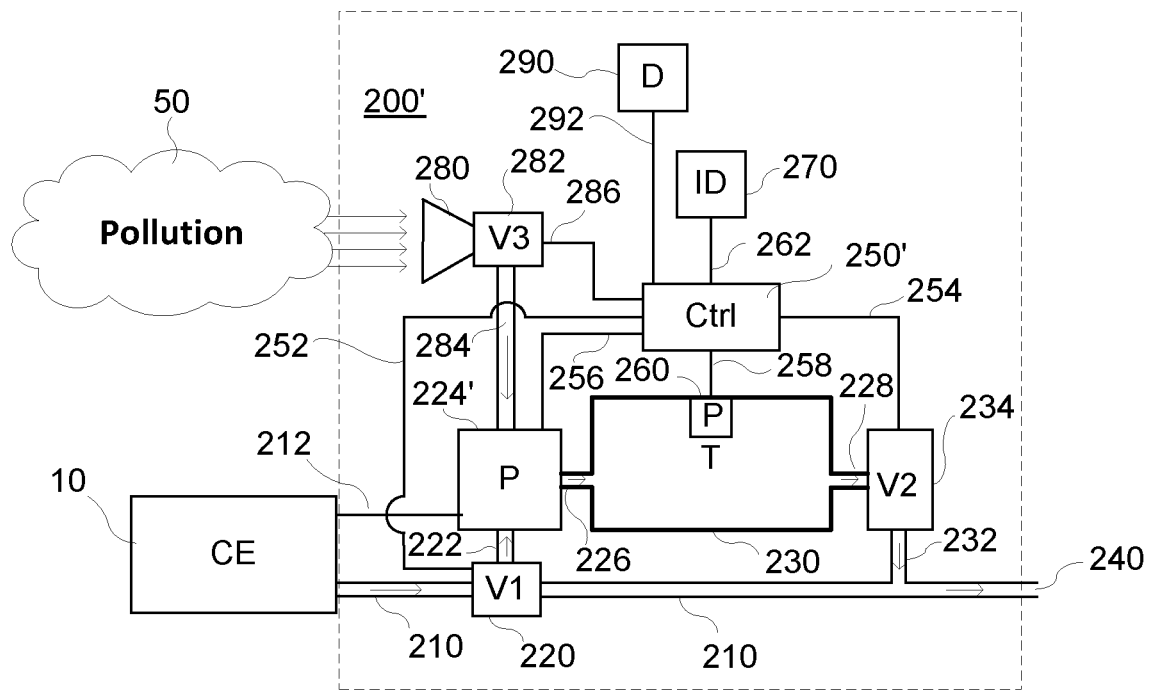
FIG. 4 is a block diagram presenting an embodiment of the system in FIG. 3 in more detail.

FIG. 4 is an embodiment of the system as described above in connection to FIG. 3. In this embodiment, vehicles also have the ability to collect and store airborne pollutants from the environment, for example sulphur oxides, nitrogen oxides, carbon oxide, etc., in addition to storing their own exhaust emissions to the environment is the same as the one for embodiments described in the system above.

The embodiment 200' of the system 200 comprises similar functional parts as the system described and illustrated in FIG. 3. Thus, the ingress valve assembly of the system comprises a first valve V1 220 connected to the exhaust pipe 210 of the vehicle 100, a connection 222 between the valve V1 and a pump, P, 224', and a connection 226 between the pump P and a container, T, 230. The pollution handling system 200' further comprises a connection 228 between the container T and a second valve, V2, 234, and an output connection 232 between the valve V2 and an output section 240. The pump is energized and provided by electric power through a conductor 212, e.g. from the generator circuits of the vehicle's engine 20.

The container T is provided with a pressure gauge, P, 260.

The pollution activation system 200' comprises a controller, Ctrl, 250' for automatically controlling and activating or deactivating the system 200'.

The controller 250' is adapted to control the valve V1 via a connection 252 for controlling said first and second positions of the valve V1. The controller 250' is further adapted to control the closing or opening of the valve V2 via a connection 254. The controller 250' is further adapted to control the operation of the pump, e.g. on or off, via a connection 256.

The pressure gauge, P, 260 connected to the ctrl 250 via a connection 258.

The ctrl 250' may further be provided with information for operating the pollution handling system 200' by means of an information device, ID, 270. The ID 270 is situated in a suitable position in the vehicle 100 and it is connected to the ctrl 250 via a connection 262.

In the embodiment 200' of the pollution handling system, the system has an additional capability to gather gases and airborne pollutions from other pollution sources contributing to the pollution in the external environment in addition to collecting the vehicle's emissions. For said purpose, the ingress valve assembly of the system 200 is equipped with an external pollution collector 280 comprising an inlet, a third valve, V3, 282, and a connection 284 for conducting external airborne pollution 50 being sucked into the inlet (see the arrows from the pollution cloud). The connection 284 is mounted to the pump 224. The valve V3 is controlled by the ctrl 50' via a connection 286. The controller 250' is adapted to control the closing or opening of the valve V3 via the connection 286, and to control the relief of the collected exhaust fumes at variable rates.

The ctrl 250 may further be provided with information for operating the pollution handling system by means of an information device, ID, 270. The ID 270 is situated in a suitable position in the vehicle 100 and it is connected to the ctrl 250 via a connection 262. The pollution handling system 200, as well as embodiments thereof may also have different information devices, IDs, 270, for providing the system with information for operating the ctrl 250, 250' of the system and its embodiments 200, 200'. Said ID 270 may be adapted to connect to a cloud service 300 via radio connection 310, e.g. comprising but not limited to the telecommunication standards WiFi, cellular GSM (Global System for Mobile Communication), GPRS (General Packet Radio Service), HSPA (High Speed Packet Access), LTE (Long Term Evolution), in order to retrieve the level of pollution, population density and other qualities in their proximate area. In addition to the cloud service, there exists infrastructure to measure qualities such as pollution, population density, etc. and report the values to the cloud service.

The pollution handling system of the vehicles may also be equipped with an ID 270 for identifying their location, e.g. by using Global Positioning System, GPS, transceiver.

In another embodiment, vehicles have built-in measurement instruments, sensors, etc., in order to measure the pollution, population density or other quality in the area themselves instead of relying on a radio connection and the aforementioned cloud service. In this embodiment, the GPS radio is also not required.

The ctrl 250' may further be connected to a display, D, 290 on an instrument panel of the vehicle 100. The ctrl 250' is adapted to send alarms or requests via a connection 292 to the display D to alert the driver/chauffeur, who may confirm the alarms and/or response to the requests by means of a key, button or touchscreen of the display.

In the following, a process and different embodiments thereof for operating in the above described system and embodiments thereof are hereafter described in more detail.

Figure 5:
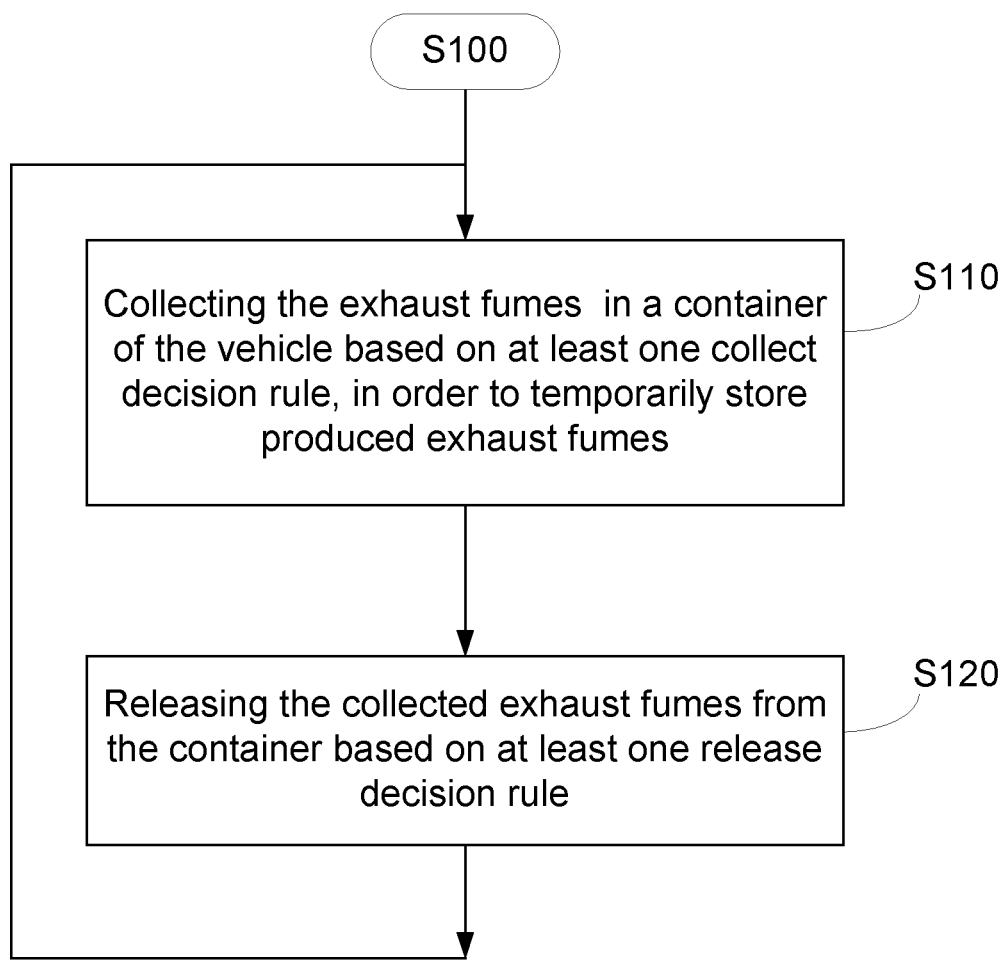
FIG. 5 is a flowchart of a pollution handling process for vehicles.

FIG. 5 is a flowchart illustrating an example of a process for pollution for vehicles driven by fuel, e.g. fossil fuel, causing emission of pollutants in the exhaust fumes. The process S100 comprises the steps of:

S110:—collecting the exhaust fumes in a container of the vehicle based on at least one collect decision rule, in order to temporarily store produced exhaust fumes; and S120:—releasing the collected exhaust fumes from the container based on at least one release decision rule.

As already described above, the pollution handling system comprises a controller, ctrl, 250, 250'. The ctrl 250, 250' is configured to activate or deactivate the pollution handling system to collect exhaust fumes by means of at least one collect decision rule, wherein the ctrl 250, 250' controls an inlet unit comprising a first valve, V1, 220 fixed mounted to the exhaust pipe and a pump, P, 224, and a second valve V2. The ctrl 250, 250' is also configured to activate or deactivate the release of collected exhaust fumes by means of at least one release decision rule, wherein the ctrl 250, 250' controls an outlet unit for releasing the exhaust fumes. Said outlet unit comprises a second valve, V2, 234 connected to the container 230 by means of a pipe connection 228.

The decision rules used by the ctrl 250, 250' may be designed in different ways. As an example, a decision rule may comprise one or more criterion of which at least one has to be fulfilled for performing the collecting or releasing of collected exhaust fumes. Information received, e.g. via the ID, 290, is input in a criterion. The criterion may be defined as a constraint, e.g. larger than, equal to, less than, for a decision to collect or release exhaust fumes. As an example, the controller is configured to receive different information of one or more parameters, e.g. the current value of a parameter. Examples of parameters that can be used by the controller for controlling the system are geographical position, surrounding area topology, surrounding area population density, surrounding area pollution density, a critical pressure in the container, and environmental conditions. The parameters are provided by the Information Device, ID, 270 and other devices, e.g. measurement instruments, sensors, electrically connected to the ctrl 250,250'. Further, one sensor is a pressure gauge, 260, mounted in the container 230. The pollution handling process may further comprise measurement of pollution density and environmental parameters, i.e. environmental conditions.

A criterion, e.g. defined as constraint, for a collect or release decision rule may be based on a pre-set or received threshold value. The threshold value may be set for a certain area by a cloud service, which transmits said value on a request from a ctrl 250, 250'. The decision rule may be fulfilled if a received parameter value either exceeds, is equal to, or is less than the threshold value for said parameter.

The collect decision rule comprises one or more criteria of which result causes the process and the system to either collect exhaust fumes, or not. The release decision rule comprises one or more criteria of which result causes the process and the system to either release the collected exhaust fumes, or not. In some embodiments, the collect decision rule and the release decision rule is similar. However, often it is better to use different criteria in the collect and release decision rules. The collect and release decision rules may be implemented in computer program software to be executed by the processor or processors or hardware of the ctrl 250, 250'.

The collecting and/or releasing processes of the pollution handling process may further comprise a collect or release decision rule that involves a time schedule for activation and deactivation of said steps. Thus, the collecting and releasing of exhaust fumes may be controlled by a time schedule. The time schedule may comprise information regarding time periods when collection and release of exhaust fumes is recommended and/or allowed, e.g. by local regulations. As an example, local regulations states that the emission of exhaust fumes is prohibited between 8 o'clock am and 5 o'clock pm in a certain area. The ctrl 250, 250' is then programmed to activate collection of exhaust fumes when entering said area and keeping the release of stored fumes deactivated. Thus, valve V1 is set into position for collecting exhaust fumes while valve V2 is in its closed position. The area parameters are received from e.g. a GPS, cloud services. When the vehicle leaves the restricted area, the controller ctrl is able to activate the release of stored exhaust fumes in the container T, and deactivate the collection of exhaust fumes.

The processes described herein may be operating in an external service based mode of operation or in a stand-alone mode of operation.

In the external service based mode, the processes and systems are supported by e.g. the Internet, a cloud service, etc. In the service based mode of operation, the ctrl 250, 250' is adapted to request from a cloud service information for the criteria in the decision rules, e.g. regarding the pollution level in an area. The requests can be generated and sent asynchronous, or synchronous. An example of an asynchronous request generation and transmission is e.g. whenever the vehicle has stored enough emissions and is able to release them. Synchronous generation is similar to periodical generation.

The cloud service may receive information about the current levels of pollution of each area through pollution sensors distributed in the area. As an example, measurement instrument in the Information Device, 270, may collect such data and the ctrl 250, 250' may be adapted to send such data via radio transmission to the cloud service. However, note that levels of pollution in the surrounding area are not the only factor in the decision of the vehicle to release exhaust fumes or not. Depending on the application, other factors may be taken into account. These factors include but are not limited to qualities such as population density of the area the vehicle is in, infrastructure, etc. Example of infrastructure may be a park, industrial area, etc.

The pollution handling process may therefore comprise a transmission of one or more information, e.g. measured parameters indicating current pollution level, to or from external services, e.g. cloud services, via a radio telecommunication standard over an air interface. Said transmission of information between said external services and the vehicle is performed by means of the Information Device, ID, that comprises a transceiver operating according to a radio telecommunication standard, e.g. WiFi, cellular GSM, GPRS, HSPA, LTE.

According to one embodiment, the process is controlled by an external controller that is externally positioned in relation to a pollution handling system of the vehicle, wherein the system and the external controller are connected using the radio telecommunication standard over the air interface.

Said external controller may be provided by a cloud service, e.g. Internet service. A cloud service is a service provided by a Service Provider. A Service Provider may provide an external controller as a dedicated computer and software capacity. The provided external controller may take over the control of the pollution handling system from the internal controller, ctrl, 250, 250'.

The process may further be adapted to collect the vehicle's exhaust fume and external airborne pollutants by means of a system 200' as described above and illustrated in FIG. 4. The pollution handling process may therefore comprise the steps of:

measuring and/or registering levels of airborne pollutants in the surrounding of the vehicle by means of one or more vehicle built-in sensors; and providing said levels to the pollution handling system controller.

The Information Device, ID, may therefor comprise said one or more vehicle built-in sensors serving in a standalone mode of operation.

In the standalone mode of operation, the pollution handling system has means of determining information for the criteria in the decision rules, therefore there is no need for the requests to a cloud service. Note that factors such as population density and geographical topology can be taken into account in this case as well, if this information has been pre-provisioned to the pollution handling system in advance.

The ctrl 250,250' may in some embodiments be adapted to control the rate of release of exhaust fumes/emissions and time length of the release process. The rate of release of emissions and the time length of the release process is than variable. The rate may be varied depending on the difference between a predefined threshold of acceptable levels of pollution minus the level of pollution of the surrounding environment received via ID 270, from sensors and/or a cloud service for delivering environmental and/or pollution data information.

If the aforementioned difference amount is close to zero, then the rate of release of emissions is low and short-lived, whereas if it is negative, no exhaust fumes are released. Note that in the latter case, there is an exception, when the density of the gas stored in the exhaust fume collector reaches critical levels, comprising structural integrity of the container—in this case, fumes are exhausted in order to relax the pressure in the container.

Figure 6:
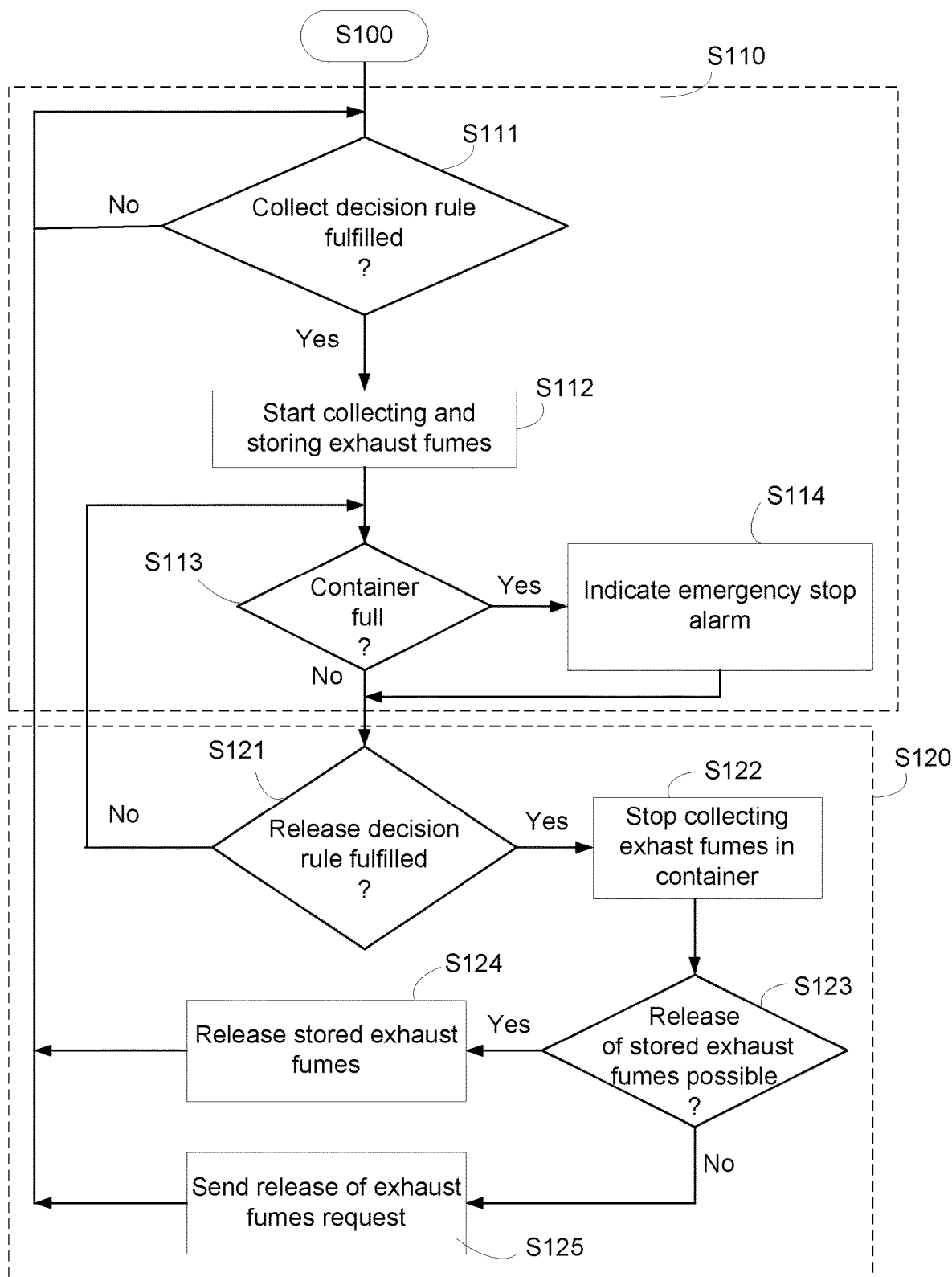
FIG. 6 is a flowchart of a an embodiment of the pollution handling process for vehicles.

One embodiment of the method is illustrated in the flowchart of FIG. 6.

The steps S110 and S120 are illustrated in FIG. 6 as boxes with dashed lines.

S110:—collecting the exhaust fumes in a container of the vehicle based on at least one collect decision rule, in order to temporarily store produced exhaust fumes; and S120:—releasing the collected exhaust fumes from the container based on at least one release decision rule.

According to the illustrated embodiment, step S110, comprises a number of steps S111, S112, S113, and S114.

The first step S111 comprises a test if the collect decision rule is fulfilled, "Collecting decision rule fulfilled?". The collect decision rule may be designed in different ways, as stated above. The collect decision rule comprises at least one criterion for each parameter that is involved for making a decision by the ctrl 250, 250'.

As an example, the controller of the system is configured to receive different information of one or more parameters. Examples of parameters that can be used by the controller for controlling the system are geographical position, surrounding area topology, surrounding area population density, surrounding area pollution density, a critical pressure in the container, and environmental conditions. The parameters are provided by the Information Device, ID, 270 and other devices, e.g. sensors, electrically connected to the ctrl 250, 250'. One such sensor is the pressure gauge, 260, in the container 230. The pollution handling process may further comprise measurement of pollution density and environmental conditions.

As an example, the collect decision rule is based on one criterion that is geographical position of the vehicle and another criterion that is surrounding area pollution density. The controller is then configured to receive parameter values stating geographical position of the vehicle and surrounding area pollution density from the Information Device, ID, 270, and to evaluate the received parameter values in the criteria of the collect decision rule.

In the cloud service based mode of operation and when on the move, the ctrl 250, 250' requests from the cloud service the level of pollution in an area. The requests can be generated and sent asynchronous, or synchronous. An example of an asynchronous request generation and transmission is e.g. whenever the vehicle has stored enough emissions and is able to release them. Synchronous generation is similar to periodical generation.

As long as said collect decision rule is not fulfilled, No, the process remains in a loop checking if the collect decision rule is fulfilled, S111.

As long as the collect decision rule is not fulfilled, No, the controller ctrl 250, 250', does not start the collecting of exhaust fumes of the process S100. As soon as the collect decision rule in test S111 is fulfilled, Yes, the ctrl 250, 250' starts the step S112 of the process, "start collecting and storing exhaust fumes".

During the filling of the container 230, the ctrl 250, 250' checks in step S113 if the "Container is full" by means of the pressure gauge P in the container. As long as the measured pressure is less than a pre-set pressure $P_F$, the collecting and storing of exhaust fumes is continued by testing at least one release decision rule of step S120. In this embodiment, it is tested in test S121, "Release decision rule fulfilled?", if the release decision rule is fulfilled.

The release decision rule may be designed in different ways, as described above. The decision rule comprises at least one criterion for each parameter that is involved for making a decision by the ctrl 250, 250'. As already stated, the controller of the system is configured to receive different information of one or more parameters. Examples of parameters that can be used by the controller for controlling the system are geographical position, surrounding area topology, surrounding area population density, surrounding area pollution density, a critical pressure in the container, and environmental conditions. The values of the parameters are provided by the Information Device, ID, 270 and other devices, e.g. sensors, electrically connected to the ctrl 250, 250'. One such sensor is the pressure gauge, 260, in the container 230. The pollution handling process may further comprise measurement of pollution density and environmental conditions. Step 120 may comprise a process of steps for releasing stored exhaust fumes.

In this embodiment of the process S100 (and operation of the system 200), the release decision rule "Release decision rule fulfilled?" may be based on a criteria regarding geographical position of the vehicle and a criteria based on the degree of pollution of the surrounding area as a constraint on the decision to release exhaust fumes. The controller 250, 250' is then configured to receive parameter values stating geographical position of the vehicle and the degree or level of pollution of the surrounding area from the Information Device, ID, 270, and to test the value of said received parameters in their corresponding criterion, respectively. As long as the geographical position of the vehicle is inside an area wherein the release decision rule is not fulfilled, the controller ctrl 250, 250', does not stop the collecting of exhaust fumes, and it remains performing a loop comprising test steps 113 (Container full?) and S121 (Release decision rule fulfilled?).

If the container full criterion is fulfilled in step 113, Yes, but the release decision rule is not fulfilled in S121, the collecting and storing of exhaust fumes is stopped and an emergency stop alarm is indicated in S114. This situation occurs, if the ctrl 250, 250' receives a measured pressure in the container that is close to equal the pressure $P_F$ from the pressure gauge 260, which pressure indicates that the container 230 is nearly full. If said situation occurs, the ctrl 250, 250' may be pre-set and adapted to release the collected exhaust fumes at a very low rate and for a certain time length to keep the pressure in the container under control. Alternatively, the ctrl 250, 250' may be adapted to indicate and send emergency stop alarm to the chauffeur of the vehicle that the container is full. The ctrl 250, 250' is connected to a display, D, 290 on an instrument panel of the vehicle. The ctrl 250, 250' is adapted to send alarms or requests via a connection 292 (see FIGS. 3 and 4) to the display D to alert the driver/chauffeur, who may confirm the alarms and/or response to the requests by means of a key, button or touchscreen of the display. The chauffeur may then manually release some of the stored exhaust fumes to decrease the pressure in the container thereby allowing continued exhaust collection until the vehicle reaches an area wherein the test criterion of release decision rule in S121 is fulfilled. Even though some of the exhaust fumes are released in an area wherein the level of pollution is measured or indicated as low, the total emission of exhaust fumes has been largely decreased.

However, if the vehicle reaches an area where emission of exhaust fumes is allowed, as tested in step S121, before the container is full, as was tested in step S113, and emission is not problematic, the collection and storing of emission fumes is stopped by the ctrl 250, 250', as in step S122.

When the collecting and storing has been stopped, and the release decision rule in step S121 is fulfilled, the ctrl 250, 250' is adapted to perform step S124, "Release stored exhaust fumes" into the air, of the process S100.

In some embodiments of the process S100 (and systems 200), the release speed of stored exhaust fumes is controlled by the ctrl 250, 250'. The rate of release of emissions and the time length of the release process depend on the difference between a predefined threshold of acceptable levels of pollution minus the level of pollution of the surrounding environment.

If the aforementioned difference amount is close to zero, then the rate of release of emissions is low and short-lived, whereas if it is negative, no exhaust fumes are released. Note that in the latter case, there is an exception, when the density of the gas stored in the container reaches critical levels, comprising structural integrity of the container—in this case, fumes are exhausted in order to relax the pressure in the container.

When the container is emptied, the process S100 returns to step S111 comprising the test if the criteria of the collect decision rule for starting the collection of exhaust fumes is fulfilled.

However, as illustrated in the embodiment of FIG. 6, an additional release decision rule, "Release of stored exhaust fumes possible?", is tested in a release test process of S123 by the ctrl 250, 250' before S124. Said test process is based on the cooperation and interaction with a cloud service on the Internet. In the cloud service based mode of operation, the ctrl 250, 250' is adapted to send a request to the cloud service for acceptance to release collected exhaust fumes in an area where the vehicle for the moment is situated. The requests can be generated and sent asynchronous, or synchronous. An example of an asynchronous request generation and transmission is e.g. whenever the vehicle has stored enough emissions and is able to release them.

If the cloud service responds with a "release accepted", the ctrl 250, 250' is adapted to perform step S124, and release stored exhaust fumes into the air. Said exhaust fumes may be filtered by means of a exhaust fume filter assembly connected to the end portion 240 of the exhaust pipe system.

However, if the cloud service responds "release not accepted", the ctrl 250, 250' is adapted to, in step S125, send a release of exhaust fumes request to the instrument panel of the vehicle. The chauffeur is alerted and may wait to release the stored fumes until the vehicle is in an area where the population density is low and/or the traffic intensity is considered to be low. The chauffeur may then manually from the instrument panel, by pushing a dedicated button thereon, get the ctrl 250, 250' to release all the stored exhaust fumes from the container into the air. Alternatively, the ctrl 250, 250' is adapted to generate and send synchronously request to the cloud service until the cloud service responds "release accepted". The exhaust fumes are then automatically released in an area wherein emission is not problematic and causing very little damage to human health.

In one embodiment, the release decision rule in step S121 is replaced by the release test process of step S123 described above. However, the cloud service may perform the release decision rule test of step S121, and the result of the test is sent back to the ctrl 250, 250' in the vehicle either as "release accepted" or "release not accepted" in a response. If release accepted, the ctrl 250, 250' is adapted to perform step S124, and release stored exhaust fumes into the air. Said exhaust fumes may be filtered by means of a exhaust fume filter assembly connected to the end portion 240 of the exhaust pipe system.

With the above described processes, the emission of exhaust fumes has been largely decreased in areas with high population density and/or high traffic intensity and/or high pollution density.

When the container is emptied, the process S100 returns to step S111 comprising the test if the criteria of the collect decision rule for starting the collection of exhaust fumes is fulfilled.

As is described in the following, the above described methods and embodiments thereof may be implemented in digital electronically circuitry, or in computer hardware, firmware, software, or in combinations of them. Apparatus of the methods and embodiment thereof may be implemented in a computer program product tangibly embodied in a machine readable storage device for execution by a programmable processor; and method steps of the method and embodiments may be performed by a programmable processor executing a program of instructions to perform functions of the method and embodiments by operating on input data and generating output.

Figure 7:
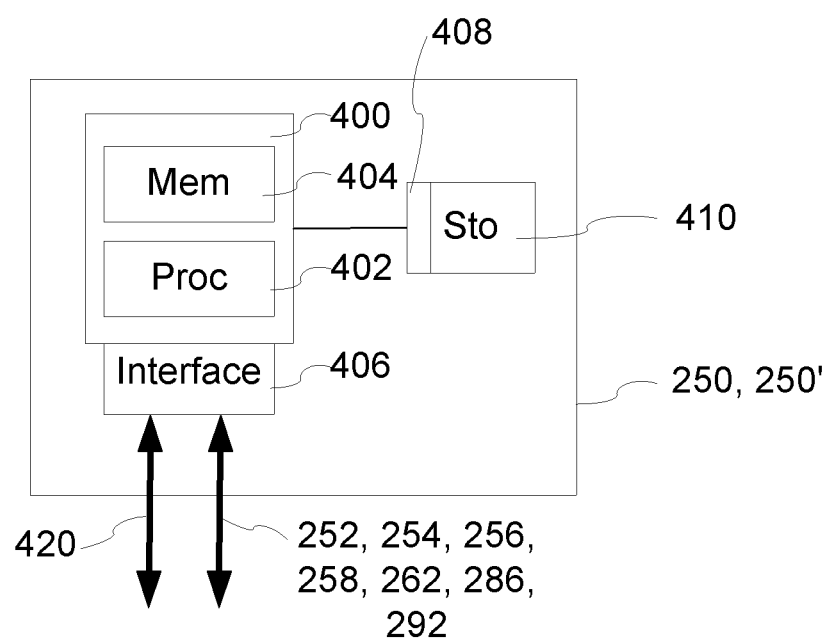
FIG. 7 is a block diagram illustrating a controller implementation of the pollution handling system.

FIG. 7 is an example of a controller implementation of the pollution handling system.

FIG. 7 is a block diagram illustrating one example of a controller 250, 250' as described and illustrated in FIGS. 3 and 4, The controller 250, 250' comprises processing circuitry 400, an interface unit 408 and an interface 405 for receiving a computer readable medium 410. The processing circuitry 400 comprises a programmable processor 402 having a memory storage 404 for executing and storing a program of instructions to perform functions of the method and embodiments by operating on input data and generating output.

As already stated, the controller 250, 250' of the system is configured to receive different information of one or more parameters. Examples of parameters that can be used by the controller for controlling the system are geographical position, surrounding area topology, surrounding area population density, surrounding area pollution density, a critical pressure in the container, and environmental conditions The processing circuitry is therefore connected to an interface unit 406 adapted to receive and transmit information over connections 420, 252, 254, 256, 258, 262, 286, 292, as illustrated in FIGS. 3 and 4. Connection 420 may be a radio channel or link, and connections in the system, such as 252, 254, 256, 258, 262, 286, 292, may be electrical connections or radio connections, e.g. Bluetooth.

Thus, it is also provided a computer program comprising computer readable code which, when run in a controller of a pollution handling system, causes the controller 250, 250' to perform a pollution handling process comprising the steps as described above.

The method and embodiments may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language or in assembly or machine language if desired; and in any case, the language may be a compiled or interpreted language.

Further, it is provided a computer program product 410 comprising a computer readable medium and a computer program wherein the computer program is stored on the computer readable medium.

Generally, a processor will receive instructions and data from a read-only memory and/or a random access memory. Storage devices suitable for tangibly embodying computer program instructions and data include all forms of non-volatile memory, including by way of example semiconductor memory devices, such as EPROM (erasable programmable read only memory), EEPROM (electrically erasable programmable read only memory), and flash memory devices; magnetic disks such internal hard disks and removable disks; magneto-optical disks; and CD-ROM (Compact Disc Read-Only Memory) disks. Any of the foregoing may be supplemented by, or incorporated in, specially—designed ASICs (Application Specific Integrated Circuits).

The entities and units described above with reference to FIGS. 3 and 4 are functional units, and do not necessarily correspond to separate physical units. Thus, the person skilled in the art would appreciate that the units disclosed in the FIGS. 3 and 4 may be implemented as physically integrated units, and/or physically separate units, and that the units are provided with appropriate processing circuits.

A number of embodiments of the present method and system have been described. It will be understood that various modifications may be made without departing from the basic principles. Therefore, other implementations are within the scope of the following claims.

The invention claimed is:

1. A pollution handling process for a vehicle, the process comprising:
   based on a collecting decision rule, collecting in a container of the vehicle exhaust fumes created by an engine of the vehicle; and
   based on a releasing decision rule, releasing into a particular area the collected exhaust fumes from the container, wherein the collecting decision rule and/or the releasing decision rule is based on population information and/or a current pollution level of the particular area into which the collected exhaust fumes are released.

2. The pollution handling process of claim 1, further comprising:
   determining a location of the vehicle; and
   obtaining the population information and/or the current pollution level based on the determined location of the vehicle.

3. The pollution handling process of claim 2, further comprising:
   communicating with an external service via a radio telecommunication connection, wherein the population information and/or the current pollution level is obtained via communicating with the external service.

4. The pollution handling process of claim 1, wherein
   collecting the exhaust fumes in the container comprises setting a first valve in a first position while a second valve is set in a first position such that the exhaust fumes are conducted to and collected in the container, and
   releasing the collected exhaust fumes from the container comprises setting the second valve in a second position such that the collected exhaust fumes are conducted to open air.

5. The pollution handling process of claim 1, wherein
   the current pollution level of the particular area is obtained using one or more measurement instruments installed at the vehicle.

6. The pollution handling process of claim 1, further comprising:
   measuring pressure level in the container;
   determining whether the measured pressure level satisfies a condition; and
   as a result of determining that the measured pressure level satisfies the condition, releasing the collected exhaust fumes from the container, wherein
   rate of releasing the collected exhaust fumes when the measured pressure level satisfies the condition is lower than the rate of releasing the collected exhaust fumes when the measured pressure level does not satisfy the condition.

7. The pollution handling process of claim 1, wherein the collecting decision rule and/or the releasing decision rule involves a time schedule for collecting and/or releasing of exhaust fumes.

8. The pollution handling process of claim 1, wherein the process involves control of a releasing rate of the collected exhaust fumes and/or control of time length of releasing the collected exhaust fumes.

9. The pollution handling process of claim 1, further comprising:
   collecting pollutants from pollution sources other than the vehicle.

10. A pollution handling system for a vehicle, the system comprising:
    a controller, and
    a container for collecting exhaust fumes created by an engine of the vehicle and for releasing the collected exhaust fumes, wherein the container is provided with an inlet unit for receiving the exhaust fumes and an outlet unit for releasing the collected exhaust fumes, wherein
    based on a collecting decision rule, the controller is configured to control collecting of the exhaust fumes in the container,
    based on a releasing decision rule, the controller is configured to control releasing of the collected exhaust fumes from the container into a particular area, and
    the collecting decision rule and/or the releasing decision rule is based on population information and/or a current pollution level of the particular area into which the collected exhaust fumes are released.

11. The pollution handling system of claim 10, further comprising:
    a location tracker for determining a location of the vehicle, wherein the population information and/or the current pollution level is obtained based on the determined location of the vehicle.

12. The pollution handling system of claim 11, further comprising:
    a radio telecommunication receiver for communicating with an external service via a radio telecommunication connection, wherein the population information and/or the current pollution level is obtained via communicating with the external service.

13. The pollution handling system of claim 10, wherein
    the exhaust fumes are collected in the container by setting a first valve in a first position and setting a second valve in a first position such that the exhaust fumes are conducted to and collected in the container, and
    the collected exhaust fumes are released from the container by setting the second valve in a second position such that the collected exhaust fumes are conducted to open air.

14. The pollution handling system of claim 10, wherein
    the current pollution level of the particular area is obtained using one or more measurement instruments installed at the vehicle.

15. The pollution handling system of claim 10, further comprising:
    a pressure sensor for measuring pressure level in the container, wherein
    the controller is configured to:
        determine whether the measured pressure level satisfies a condition,
        as a result of determining that the measured pressure level satisfies the condition,
    release the collected exhaust fumes from the container, and
    rate of releasing the collected exhaust fumes when the measured pressure level satisfies the condition is lower than the rate of releasing the collected exhaust fumes when the measured pressure level does not satisfy the condition.

16. The pollution handling system of claim 10, wherein the collecting decision rule and/or the releasing decision rule involves a time schedule for collecting and/or releasing of exhaust fumes.

17. The pollution handling system of claim 10, wherein the controller of the pollution handling system is adapted to control rate of releasing the collected exhaust fumes and/or time length of releasing the collected exhaust fumes.

18. The pollution handling system of claim 10, further comprising:
- a pollution collector for collecting pollutants from pollution sources other than the vehicle.

19. A computer program product comprising a non-transitory computer readable medium storing a computer program comprising computer readable code which, when run in a controller of a pollution handling system, causes the system to perform a pollution handling process comprising:
- based on a collecting decision rule, collecting in a container of a vehicle exhaust fumes created by an engine of the vehicle; and
- based on a releasing decision rule, releasing into a particular area the collected exhaust fumes from the container, wherein
- the collecting decision rule and/or the releasing decision rule is based on population information and/or a current pollution level of the particular area into which the collected exhaust fumes are released.

20. The computer program product of claim 19, wherein the computer program comprises computer readable code for:
- collecting the exhaust fumes in the container by setting a first valve in a first position while a second valve is set in a first position, and
- releasing the collected exhaust fumes from the container by setting the second valve in a second position.

* * * * *